US012645310B2

(12) United States Patent
Kamiyama

(10) Patent No.: US 12,645,310 B2
(45) **Date of Patent: *Jun. 2, 2026**

(54) ELECTRONIC PEN, ELECTRONIC PEN CARTRIDGE, AND ELECTRONIC PEN MAIN UNIT

(71) Applicant: Wacom Co., Ltd., Saitama (JP)

(72) Inventor: Ryoji Kamiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/003,713

(22) Filed: Dec. 27, 2024

(65) Prior Publication Data

US 2026/0118976 A1 Apr. 30, 2026

Related U.S. Application Data

(63) Continuation of application No. 18/476,833, filed on Sep. 28, 2023, now Pat. No. 12,216,841, which is a (Continued)

(30) Foreign Application Priority Data

Mar. 13, 2019 (JP) ................................. 2019-045331

(51) Int. Cl.
*G06F 3/03* (2006.01)
*G06F 3/0354* (2013.01)
(Continued)

(52) U.S. Cl.
CPC ........ *G06F 3/03545* (2013.01); *G06F 3/0383* (2013.01); *G06F 3/044* (2013.01); *G06F 3/046* (2013.01)

(58) Field of Classification Search
CPC .... G06F 3/03545; G06F 3/0383; G06F 3/044; G06F 3/046; G06F 2203/04105;
(Continued)

(56) References Cited

U.S. PATENT DOCUMENTS 8,322,937 B2 12/2012 Imamura et al.
11,809,644 B2 * 11/2023 Kamiyama .......... B43K 24/163
(Continued)

FOREIGN PATENT DOCUMENTS

CN 108369458 A 8/2018
JP 2016126503 A 7/2016
(Continued)

OTHER PUBLICATIONS

International Search Report, dated Dec. 24, 2019, for International Application No. PCT/JP2019/040544. (2 pages).
(Continued)

*Primary Examiner* — Lunyi Lao
*Assistant Examiner* — Jarurat Suteerawongsa
(74) *Attorney, Agent, or Firm* — Seed Intellectual Property Law Group LLP

(57) ABSTRACT

An electronic pen cartridge is mounted on a mounting part disposed in a pen-shaped casing. The electronic pen cartridge includes an electronic pen main unit and a mounting adapter. The electronic pen main unit includes a first coupling part configured to connect the mounting adapter to the electronic pen main unit in an axial center direction. The mounting adapter includes a second coupling part connected to the first coupling part of the electronic pen main unit, a third coupling part connected to the mounting part of the casing, and an elastic component that causes an elastic force to act between the mounting adapter and the electronic pen main unit in a connected state in which the second coupling part is connected to the first coupling part of the electronic pen main unit.

19 Claims, 8 Drawing Sheets

Related U.S. Application Data continuation of application No. 17/408,186, filed on Aug. 20, 2021, now Pat. No. 11,809,644, which is a continuation of application No. PCT/JP2019/040544, filed on Oct. 16, 2019.

(51) Int. Cl.
| | | |
|---|---|---|
| *G06F 3/038* | (2013.01) | |
| *G06F 3/044* | (2006.01) | |
| *G06F 3/046* | (2006.01) | |

(58) Field of Classification Search
CPC ......... G06F 3/03; B43K 24/163; B43K 27/08; B43K 29/08
See application file for complete search history.

(56) References Cited

U.S. PATENT DOCUMENTS

| | | | | |
|---|---|---|---|---|
| 12,216,841 | B2* | 2/2025 | Kamiyama | ........... G06F 3/0383 |
| 2004/0155862 | A1 | 8/2004 | Higginson | |
| 2009/0084614 | A1* | 4/2009 | Fukushima | ......... G06F 3/03545 |
| | | | | 178/19.03 |
| 2016/0188016 | A1 | 6/2016 | Munakata et al. | |
| 2017/0308185 | A1 | 10/2017 | Eguchi | |
| 2017/0357340 | A1 | 12/2017 | Kamiyama et al. | |
| 2018/0314351 | A1 | 11/2018 | Kaneda et al. | |
| 2019/0179434 | A1 | 6/2019 | Tanaka et al. | |
| 2020/0363881 | A1 | 11/2020 | Nakayama et al. | |

FOREIGN PATENT DOCUMENTS

| | | |
|---|---|---|
| WO | WO 2016143498 A1 | 9/2016 |
| WO | WO 2017134917 A1 | 8/2017 |

OTHER PUBLICATIONS

Notice of First Examination Opinion, dated Feb. 28, 2024, for Chinese Patent Application No. 201980092407.2. (14 pages) (with English Machine Translation).

\* cited by examiner

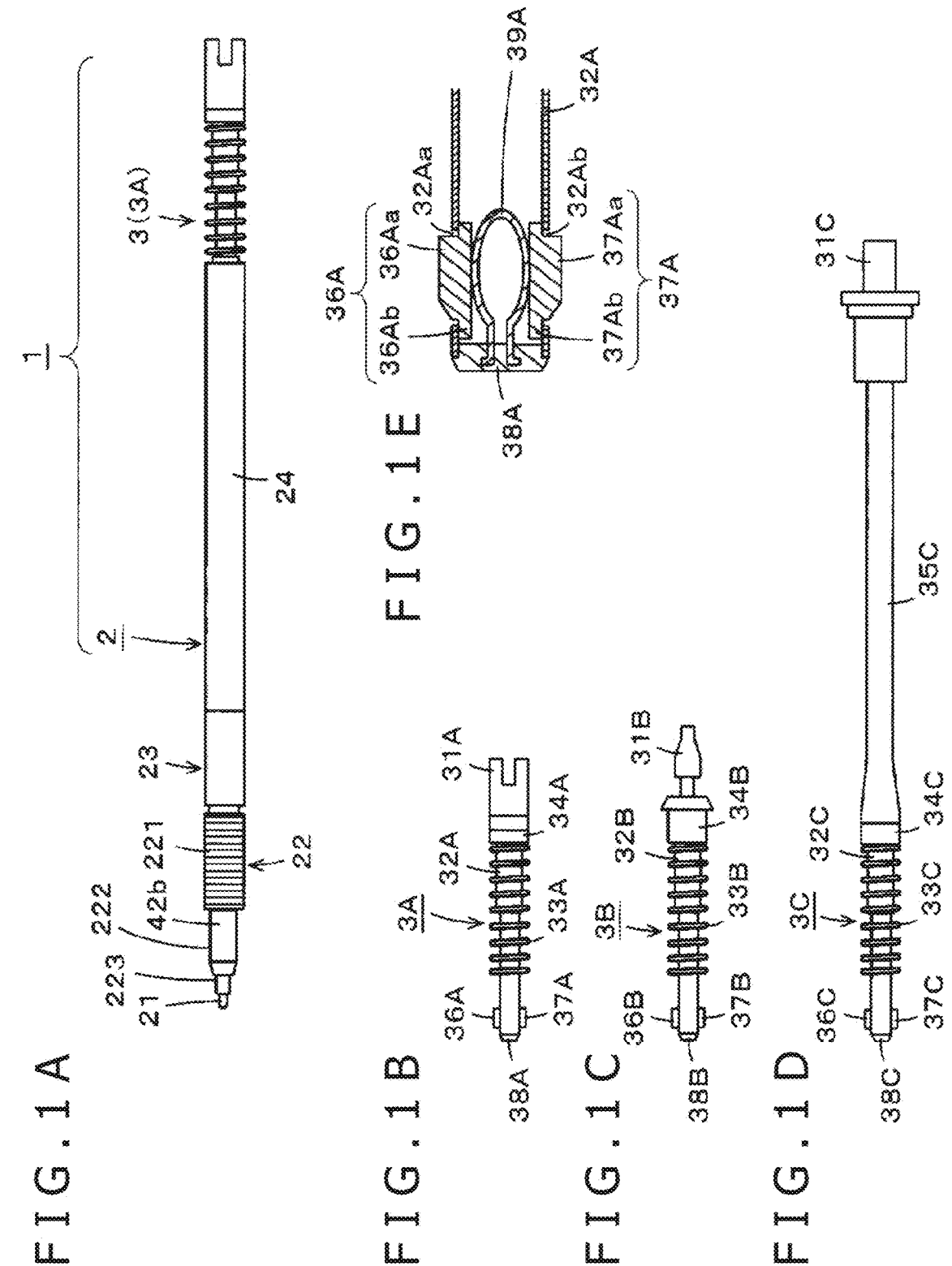
F I G . 1 A
F I G . 1 B
F I G . 1 C
F I G . 1 D
F I G . 1 E

FIG.4A
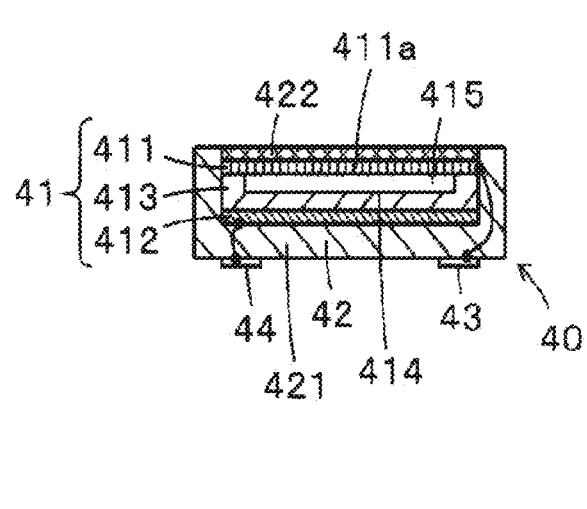
FIG.4B
FIG.5A
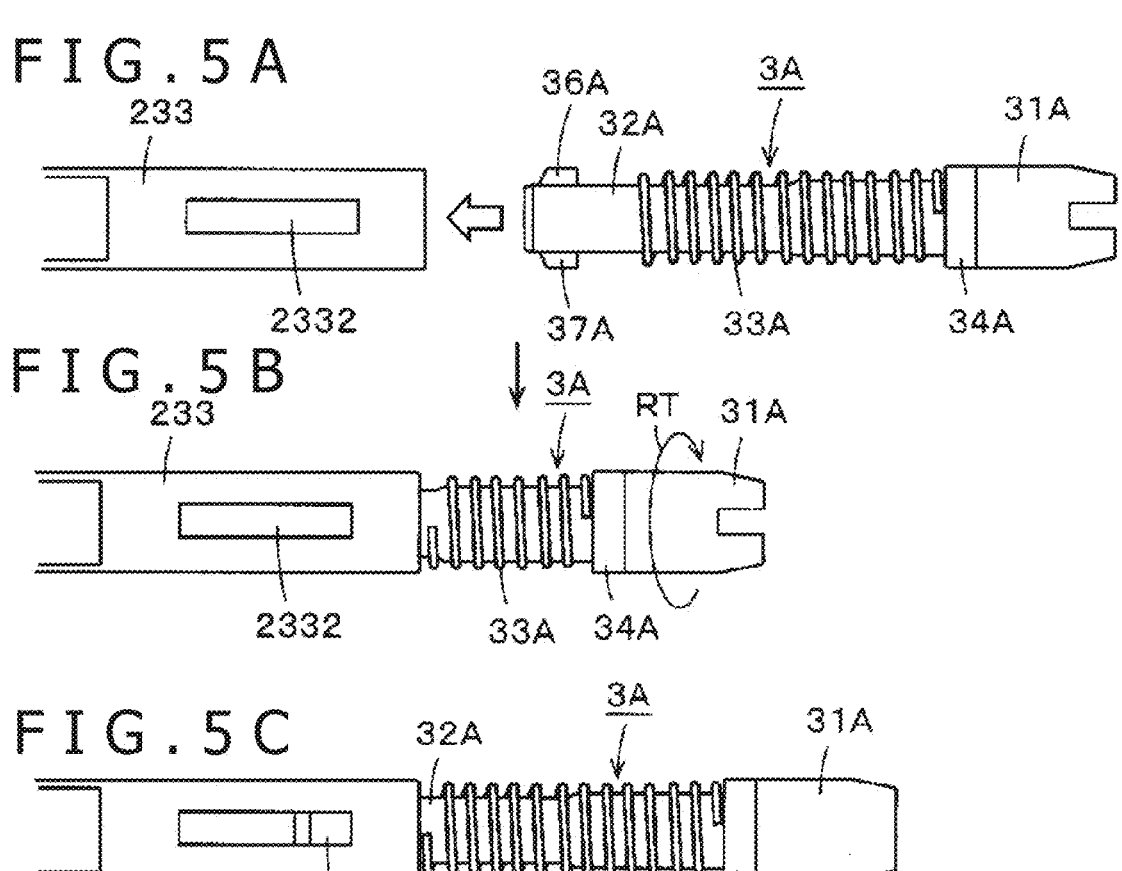
FIG.5B
FIG.5C

F I G . 7
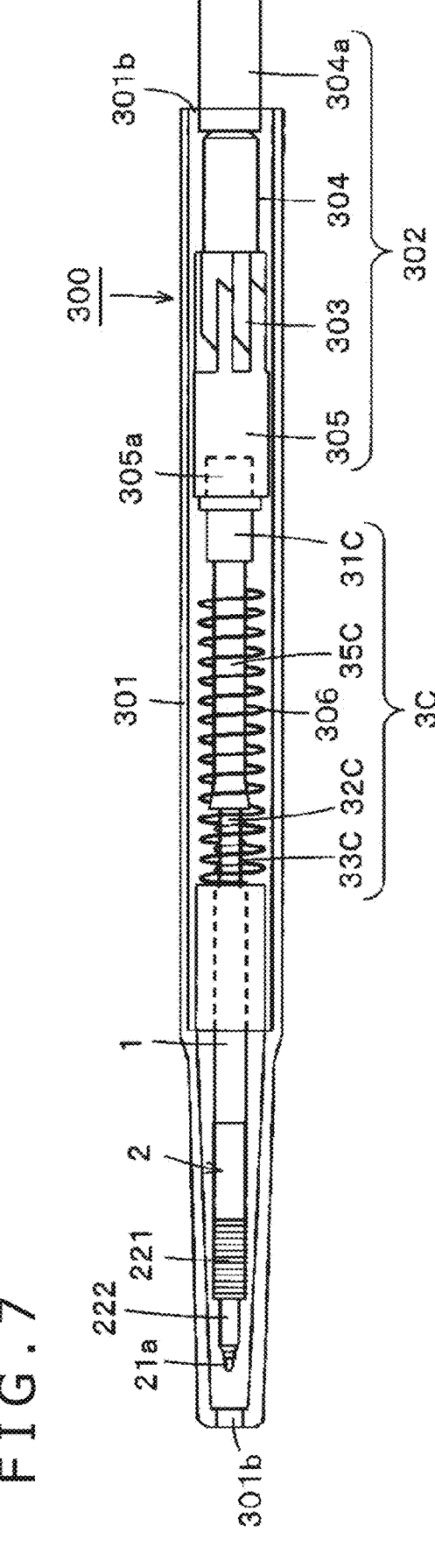

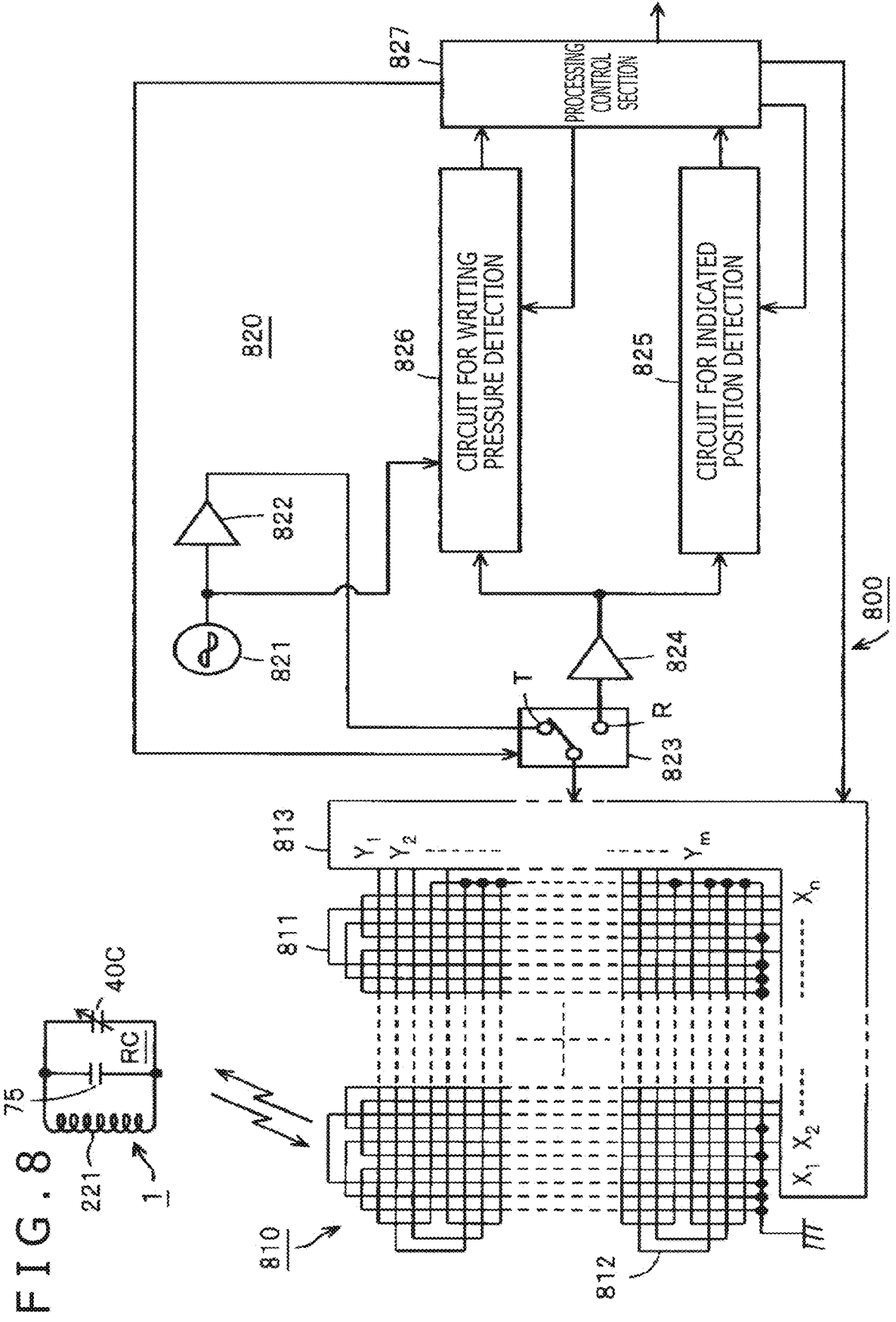
F I G . 8

ELECTRONIC PEN, ELECTRONIC PEN CARTRIDGE, AND ELECTRONIC PEN MAIN UNIT

BACKGROUND

Technical Field

The present invention relates to an electronic pen used with a position detecting device. Specifically, the invention relates to an electronic pen cartridge housed in a casing of an electronic pen and an electronic pen main unit that forms the electronic pen cartridge.

Description of the Related Art

Writing implements, such as knock-type ballpoint pens and multicolor ballpoint pens, each includes a pen refill (a refill) designed specifically for these ballpoint pens and formed as a cartridge or an ink refill to be mounted on a mounting part disposed in a dedicated casing. Because of this configuration, in the knock-type ballpoint pens and the multicolor ballpoint pens, the refills of the ballpoint pens in the form of a cartridge or an ink refill can be readily replaced as appropriate.

Similarly, in electronic pens also, electronic pen cartridges have been introduced and used, wherein an electronic pen main unit, which forms a major part of the electronic pen, has the form of a cartridge. There has also been provided an electronic pen, in which the dimensions of the electronic pen main unit that forms the electronic pen cartridge are set to be the same dimensions as a pen refill of a ballpoint pen, such that the electronic pen main unit can be mounted on a mounting part of a casing of a knock-type ballpoint pen or a multicolor ballpoint pen that is used as a writing implement (for example, refer to Domestic Republication of PCT International Application No. JP 2016/143498).

The electronic pen main unit of the electronic pen cartridge having such a configuration makes it possible to re-use the casing of a knock-type ballpoint pen or a multicolor ballpoint pen, which is a writing implement, as it is and mount the electronic pen main unit on the mounting part of the casing, resulting in a very convenient electronic pen main unit. Further, because the casing of a multicolor ballpoint pen, which is a writing implement, can be re-used, the electronic pen main unit and a pen refill of a ballpoint pen can be housed in the casing and either one can be selected and used as appropriate. Thus, a multifunction electronic pen that has functions of the writing implement and is equipped with functions of the electronic pen can be realized, which is convenient because the electronic pen and another writing implement do not need to be separately carried.

BRIEF SUMMARY

Pen refills of knock-type ballpoint pens and multicolor ballpoint pens are respectively designed for the knock-type ballpoint pens and for the multicolor ballpoint pens, as described above, and are set to have different lengths in many cases.

Further, the structure of the mounting part for the pen refill often slightly differs between the knock-type ballpoint pen and the multicolor ballpoint pen. In addition, in the multicolor ballpoint pens, some ballpoint pens include a mechanism to select pen refills of different colors by sliding a knock bar, while other ballpoint pens include a mechanism to select pen refills of different colors by a rotation system. In this case, the structures of the mounting part of the casing are often different from each other.

For this reason, with respect to the electronic pen main unit of the conventional electronic pen cartridge, its length size and a coupling part to engage with the mounting part of a casing need to be configured differently according to the casing to be mounted in. However, there is a problem that the electronic pen main unit is generally more expensive than the pen refill of a ballpoint pen and that a user needs to purchase all of these expensive electronic pen main units of the electronic pen cartridges, for different casings to be used, which would be costly.

The present disclosure is directed to providing an electronic pen cartridge that is capable of solving the above-described problems.

In order to solve the above-described problems, there is provided an electronic pen cartridge configured to be mounted on a mounting part disposed in a pen-shaped casing, the electronic pen cartridge including:

an electronic pen main unit that includes an interaction part configured to perform transmission and reception of signals with a position detecting sensor and that includes a tip part configured to be capable of protruding outside from one opening part of the casing; and a mounting adapter interposed between the electronic pen main unit and the mounting part, wherein the electronic pen main unit includes, at an end part of the electronic pen main unit that is opposite to the tip part in an axial center direction, a first coupling part configured to connect the mounting adapter to the electronic pen main unit in the axial center direction, and the mounting adapter includes, at one end part of the mounting adapter in the axial center direction, a second coupling part connected to the first coupling part of the electronic pen main unit, and includes, at the other end part of the mounting adapter in the axial center direction, a third coupling part connected to the mounting part of the casing, and the mounting adapter further includes an elastic component that, in a connected state in which the second coupling part is connected to the first coupling part of the electronic pen main unit, causes an elastic force to act between the mounting adapter and the electronic pen main unit, the elastic force being exerted to separate the mounting adapter from the electronic pen main unit in the axial center direction.

The electronic pen cartridge having the above-described configuration includes the electronic pen main unit and the mounting adapter. According to the electronic pen cartridge having this configuration, the mounting adapter is interposed between the electronic pen main unit and the mounting part of the casing, and thus the length of the casing in the axial center direction can be adjusted (accommodated) according to the length of the mounting adapter in the axial center direction.

Further, the mounting adapter includes the third coupling part configured to be connected to the mounting part of the casing. Therefore, the first coupling part of the electronic pen main unit can have a predetermined (standard) configuration to be connected to the second coupling part of the mounting adapter, irrespective of the particular structure of the mounting part of the casing.

Accordingly, the electronic pen cartridge that can be mounted in various electronic pen casings can be configured, by sharing (re-using) the same electronic pen main unit among various casings while exchanging (replacing) different mounting adapters according to the configurations and the lengths in the axial center direction of the mounting parts of these casings. Thus, the user can use one common electronic pen main unit, which is relatively expensive, with plural types of electronic pen casings, while using multiple mounting adapters, which are relatively inexpensive, correspondingly to the plural types of electronic pen casings. Therefore, the cost burden can be alleviated.

Further, in the electronic pen cartridge having the above-described configuration, while the electronic pen cartridge is configured in such a manner that the mounting adapter is connected to the electronic pen main unit in the axial center direction, the elastic component of the mounting adapter ensures that the connection is firmly established without looseness. Therefore, the user, when indicating a position on an input surface using the tip part of the electronic pen main unit, will not experience a sense of discomfort due to, for example, looseness in the axial center direction in the electronic pen cartridge.

BRIEF DESCRIPTION OF THE SEVERAL VIEWS OF THE DRAWINGS

FIG. 1A to FIG. 1E are diagrams illustrating configuration examples of an embodiment of the electronic pen cartridge;

FIG. 2A to FIG. 2C are diagrams illustrating configuration examples of an electronic pen main unit that forms the electronic pen cartridge of the embodiment of FIG. 1A to FIG. 1E;

FIG. 4A and FIG. 4B are diagrams illustrating configuration examples of a writing pressure detector mounted in the electronic pen main unit of the example of FIG. 3;

FIG. 5A to FIG. 5C are diagrams illustrating configuration examples of a mounting adapter connected to the electronic pen main unit that forms the electronic pen cartridge of the embodiment in FIG. 1A to FIG. 1E;

FIG. 7 is a diagram illustrating another configuration example of the embodiment of the electronic pen;

FIG. 8 is a diagram illustrating an electronic circuit example of a position detecting device used with the embodiment of the electronic pen according to the present disclosure.

DETAILED DESCRIPTION

Figure 3:
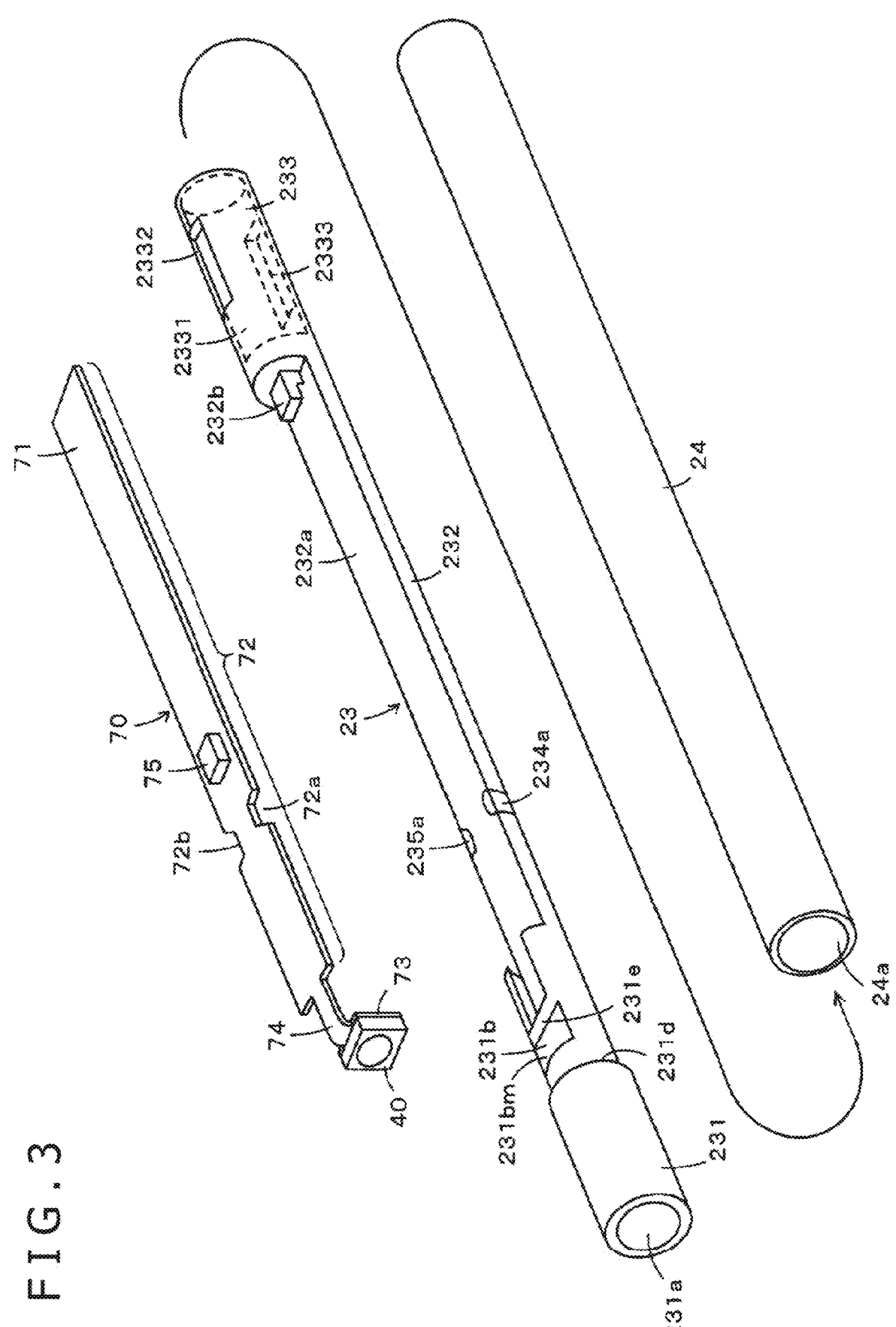
FIG. 3 is a diagram illustrating a configuration example of the electronic pen main unit that forms the electronic pen cartridge of the embodiment of FIG. 1A to FIG. 1E.

Embodiments of an electronic pen cartridge according to the present disclosure will be described below with reference to the drawings. FIG. 1A to FIG. 1E illustrate embodiments of the electronic pen cartridge according to the present disclosure.

An electronic pen cartridge 1 of the embodiment in FIG. 1A to FIG. 1E includes an electronic pen main unit 2 and a mounting adapter 3, and is configured by connecting (coupling) the electronic pen main unit 2 and the mounting adapter 3 with each other in the axial center direction as illustrated in FIG. 1A. The mounting adapter 3 is configured to be attachable and detachable to and from (replaceable relative to) the electronic pen main unit 2.

Configuration Example of Electronic Pen Main Unit 2

As illustrated in FIG. 1A, the electronic pen main unit 2 of this embodiment includes a shaft body 21, a signal transmission component 22, a holder 23 that holds a writing pressure detector and a circuit board as described later, and a main unit casing component 24 having a function of housing and protecting the writing pressure detector and the circuit board held by the holder 23.

In this example, the shaft body 21 is a rod-shaped component composed of a resin material that is relatively hard and has elasticity, such as polyoxymethylene (POM), and the diameter thereof is set to approximately 1 mm, for example.

The signal transmission component 22 forms an interaction part configured to interact with a position detecting sensor. In this embodiment, the signal transmission component 22 includes a coil 221, a magnetic core, specifically a ferrite core 222 in this example, and a shaft pipe component 223. The coil 221 forms a resonant circuit to perform signal transmission and reception (interaction) with a position detecting device by the electromagnetic induction system in the illustrated example. The coil 221 is wound around the ferrite core 222. The shaft pipe component 223 is fitted and fixed in a through-hole 222a of the ferrite core 222.

The holder 23 is composed of a resin material, for example, and includes a cylindrical part 231 that holds a writing pressure detector 40 to be described later and that is fitted to the ferrite core 222 of the signal transmission component 22. The holder 23 also includes, monolithically with the cylindrical part 231, a circuit board placement base 232 (see FIG. 3 to be described later), about which illustration is omitted in FIG. 1A. Further, the side of the ferrite core 222 and the shaft pipe component 223 of the signal transmission component 22, which is opposite to the pen tip side in the axial center direction, is inserted and fitted in the cylindrical part 231, and the signal transmission component 22 and the holder 23 are connected in the axial center direction.

The main unit casing component 24 has a hollow part therein that houses a part of the cylindrical part 231 of the holder 23. The main unit casing component 24 includes a pipe-shaped component composed of a hard material, such as a metal for example, and forms a circuit part protective component that protects the writing pressure detector and an electronic circuit component part of the circuit board.

The circuit board placement base 232 and a portion of the cylindrical part 231 of the holder 23 are housed in the hollow part of the main unit casing component 24, and the main unit casing component 24 and the holder 23 are connected. In the axial center direction, the mounting adapter 3 is connected to the side of the main unit casing component 24 that is opposite to the side connected to the signal transmission component 22.

Configuration Example of Mounting Adapter 3

In this embodiment, the mounting adapter 3 that can be attached to and detached from the electronic pen main unit 2 is configured in such a manner that plural mounting adapters 3 are prepared according to different casings of the electronic pen in which the electronic pen cartridge 1 is housed and mounted. Thus, even with different casings of the electronic pen, the electronic pen cartridge 1 can be housed and mounted in each of the different casings by simply replacing the mounting adapter 3.

In the case of a knock-type ballpoint pen, it should be taken into account that the length of the electronic pen cartridge 1 in the axial center direction differs from the length of a pen refill for a multicolor ballpoint pen or a multifunction pen.

In the example in FIG. 1, three kinds of mounting adapters 3 are provided as illustrated in FIGS. 1B, 1C, and 1D. In the following description, in order to distinguish between the three kinds of mounting adapters 3, the mounting adapters 3 illustrated in FIGS. 1B, 1C, and 1D are given suffixes A, B, and C to be indicated as a mounting adapter 3A, a mounting adapter 3B, and a mounting adapter 3C, respectively.

As described later, the electronic pen cartridge 1 of this embodiment is configured for use with the casing of a commercially-available multicolor ballpoint pen, or with the casing of a multifunction pen, or with the casing of a knock-type ballpoint pen. It is to be noted that the multifunction pen means a writing implement that allows selective use of multiple writing implements different in the writing functions, such as a ballpoint pen and a mechanical pencil, for example.

In this embodiment, in the multicolor ballpoint pen and the multifunction pen, the electronic pen cartridge 1 is of substantially the same length in the axial center direction but the mounting part of the casing of the electronic pen in which the electronic pen cartridge 1 is mounted may have different configurations. Thus, the mounting adapter 3A and the mounting adapter 3B are prepared as illustrated in FIG. 1B and FIG. 1C. In the case of the knock-type ballpoint pen, the length of the pen refill in the axial center direction is relatively long, and the mounting part of the casing is disposed in a knock mechanism part. Therefore, the mounting adapter 3C is prepared as illustrated in FIG. 1D to correspond with such a configuration.

Specifically, the mounting adapter 3A illustrated in FIG. 1B includes a coupling part 31A connected to a mounting part of the casing of a multicolor ballpoint pen or a multifunction pen. In the example in FIG. 1B, the coupling part 31A is configured as a fitting recess into which a fitting protrusion that is disposed on the mounting part side of the casing of a multicolor ballpoint pen or a multifunction pen is to be fitted. The mounting adapter 3B illustrated in FIG. 1C includes a coupling part 31B connected to a mounting part of the casing of a multicolor ballpoint pen or a multifunction pen. In the example in FIG. 1C, the coupling part 31B is configured as a fitting protrusion to be fitted into a fitting recess that is disposed on the mounting part side of the casing of a multicolor ballpoint pen or a multifunction pen. It is to be noted that, in the electronic pen cartridge 1 illustrated in FIG. 1A, the mounting adapter 3A is connected to the electronic pen main unit 2.

The mounting adapter 3C illustrated in FIG. 1D corresponds to the length of the casing of a knock-type ballpoint pen in the axial center direction and includes a coupling part 31C that corresponds to a mounting part disposed in a knock mechanism part.

The coupling parts 31A, 31B, and 31C of the mounting adapters 3A, 3B, and 3C configure a third coupling part in the scope of the claims.

The configurations of the mounting adapters 3A, 3B, and 3C on the side to be connected to the electronic pen main unit 2 in this embodiment are made in a similar manner as illustrated in FIGS. 1B, 1C, and 1D. Specifically, on the side to be connected to the electronic pen main unit 2, the mounting adapters 3A, 3B, and 3C respectively include rod-shaped components 32A, 32B, and 32C having a predetermined length in the axial center direction and coil springs 33A, 33B, and 33C disposed elastically displaceably in the axial center direction around the rod-shaped components 32A, 32B, and 32C in such a manner as to each house a corresponding one of these rod-shaped components 32A, 32B, and 32C at the center of its coil winding space.

In this embodiment, the lengths of the rod-shaped components 32A, 32B, and 32C in the axial center direction are the same. The same coil spring may be used as the coil springs 33A, 33B, and 33C. In the mounting adapters 3A, 3B, and 3C, coil stopper parts 34A, 34B, and 34C having a diameter larger than that of the coil springs 33A, 33B, and 33C are disposed on the side of the rod-shaped components 32A, 32B, and 32C that is opposite to the tip side connected to the electronic pen main unit 2.

Because these coil stopper parts 34A, 34B, and 34C are provided, the positions of the coil springs 33A, 33B, and 33C in the axial center direction are restricted. Thus, when the mounting adapter 3A, 3B, or 3C is connected to the electronic pen main unit 2, the electronic pen main unit 2 is always elastically displaced toward the tip part of the electronic pen main unit 2 with respect to the mounting adapter 3A, 3B, or 3C by the elastic force of the coil spring 33A, 33B, or 33C.

In this embodiment, the mounting adapters 3A and 3B have configurations in which the above-described coupling part 31A and coupling part 31B are attached to the coil stopper parts 34A and 34B. In the case of the mounting adapter 3C, a length adjustment part 35C is interposed between the coil stopper part 34C and the coupling part 31C.

The rod-shaped components 32A, 32B, and 32C of the mounting adapters 3A, 3B, and 3C in this embodiment are formed as cylindrical parts. At the end parts of the rod-shaped components 32A, 32B, and 32C on the side to be connected to the electronic pen main unit 2, a pair of projections 36A and 37A, a pair of projections 36B and 37B, and a pair of projections 36C and 37C that can protrude and retract elastically in a direction orthogonal to the axial center direction are disposed, wherein the pair of projections are placed separately from each other by an interval of 180 degrees on the circumferential side surface of the corresponding one of the rod-shaped components 32A, 32B, and 32C.

FIG. 1E is a sectional view illustrating the end part of the mounting adapter 3A on the side to be connected to the electronic pen main unit 2. The end parts of the other mounting adapters 3B and 3C on the side to be connected to the electronic pen main unit 2 are similarly configured. Therefore, the description regarding the configuration of the end parts of these other mounting adapters 3B and 3C on the side connected to the electronic pen main unit 2 is omitted.

As illustrated in FIG. 1E, through-holes 32Aa and 32Ab that allow the projections 36A and 37A to protrude in the direction orthogonal to the axial center direction are formed at positions separate from each other by an interval of 180 degrees on the circumferential side surface of the end part of the rod-shaped component 32A, which is formed as a cylindrical part, on the side to be connected to the electronic pen main unit 2.

As illustrated in FIG. 1E, the projections 36A and 37A include protruding parts 36Aa and 37Aa that can protrude from the through-holes 32Aa and 32Ab and locking parts 36Ab and 37Ab that prevent the projections 36A and 37A from falling off from the through-holes 32Aa and 32Ab. The projections 36A and 37A are disposed on the rod-shaped component 32A in a state in which the protruding parts 36Aa and 37Aa protrude from the through-holes 32Aa and 32Ab.

As illustrated in FIG. 1E, into an opening part of the cylindrical rod-shaped component 32A on the side to be connected to the electronic pen main unit 2, a closing part 38A is inserted to close this opening part. To the closing part 38A, an elastic component 39A is attached, which presses and displaces the projections 36A and 37A in the direction orthogonal to the axial center direction as illustrated in FIG. 1E when the closing part 38A is fitted into the opening part of the rod-shaped component 32A. In the example in FIG. 1E, a plate-shaped component such as a metal having elasticity is shaped into an Ω-shape and used as the elastic component 39A.

Therefore, when a force is applied to the projections 36A and 37A toward the center of the rod-shaped component 32A, in the direction orthogonal to the axial center direction, the projections 36A and 37A are displaced to retract toward the hollow part of the rod-shaped component 32A against the elastic force of the elastic component 39A.

When the mounting adapter 3A is connected to the electronic pen main unit 2, these projections 36A and 37A temporarily retract to the side of the rod-shaped component 32A and thereafter protrude by the elastic force of the elastic component 39A in the connected state. Thus, the connected state of the electronic pen main unit 2 and the mounting adapter 3A can be maintained. This connected state of the electronic pen main unit 2 and the mounting adapter 3A will be further described later.

As described above, also in the other mounting adapters 3B and 3C, closing parts 38B and 38C have elastic components similar to the elastic component 39A at opening parts of the rod-shaped components 32B and 32C on the side to be connected to the electronic pen main unit 2, as illustrated in FIG. 1C and FIG. 1D. The closing parts 38B and 38C are fitted and mounted to the rod-shaped components 32B and 32C to allow the mounting adapters 3B and 3C to be connected to the electronic pen main unit 2, similarly to the above-described mounting adapter 3A.

As described above, the mounting adapter 3 is connected in the axial center direction to the electronic pen main unit 2 including the signal transmission component 22, the holder 23, and the main unit casing component 24. Thus, the electronic pen cartridge 1 is configured as a cartridge having the same outer shape as a pen refill of a ballpoint pen.

Figures 2A, 2B, 2C:
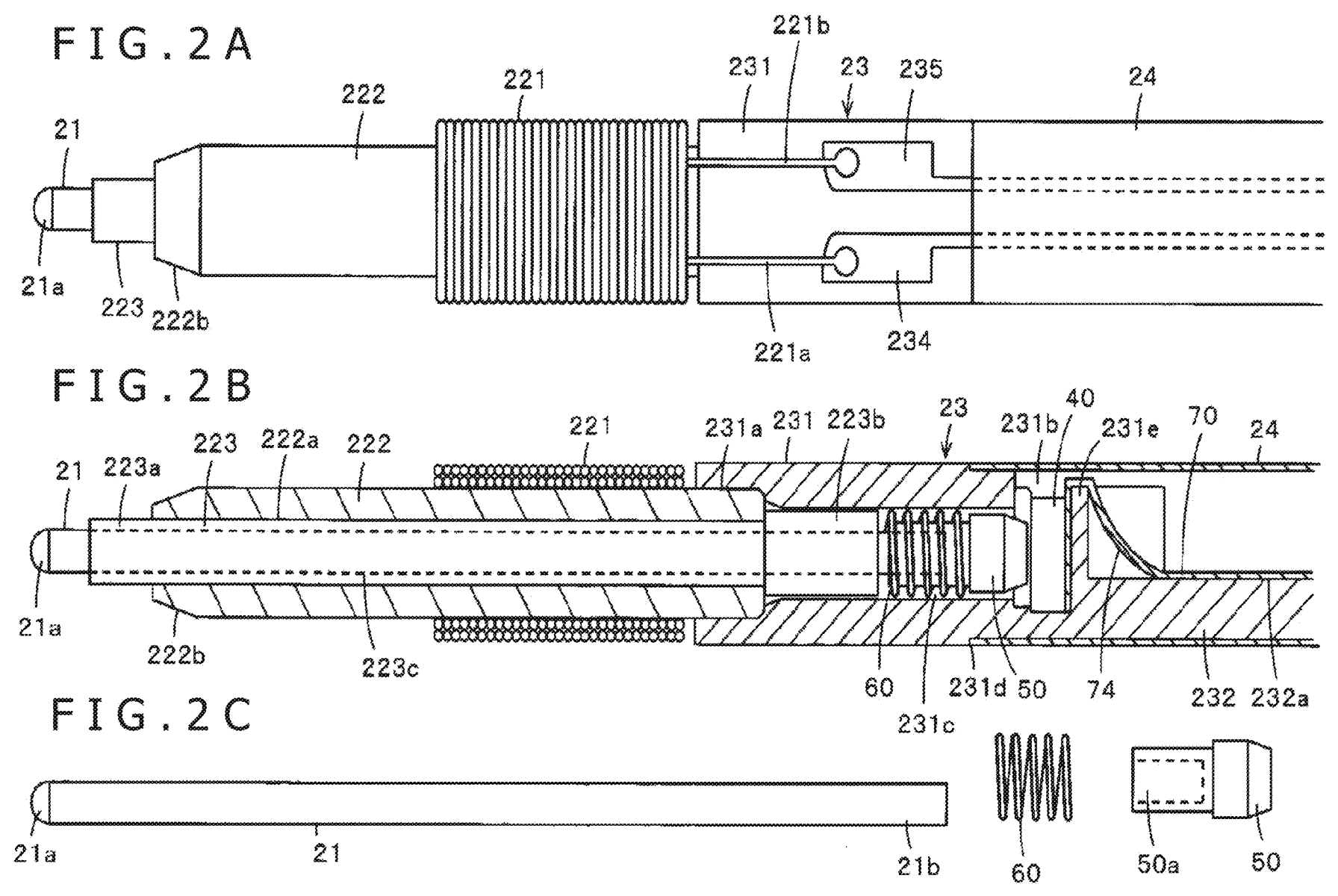

FIG. 2A is a diagram illustrating, in a magnified view, the signal transmission component 22 as a whole and a portion of the holder 23 that is connected to the main unit casing component 24. FIG. 2B is a longitudinal sectional view of FIG. 2A. FIG. 2C is a diagram illustrating the shaft body 21 as extracted. In FIG. 2B, the shaft pipe component 223 and the shaft body 21 are illustrated not in a cross-sectional view for the purpose of explanation.

The ferrite core 222 in this example has a through-hole 222a (see FIG. 2B), which has a predetermined diameter and which extends along the axial center direction. The shaft pipe component 223 is inserted in the through-hole 222a. A taper part 222b that is gradually tapered is formed on the pen tip side of the ferrite core 222. Because the taper part 222b is provided, the density of magnetic flux that passes through the ferrite core 222 becomes high density at the taper part 222b, and magnetic coupling with a position detecting sensor of a position detecting device can be made strongly as compared with the case in which the taper part 222b is not provided.

As illustrated in FIG. 2B, the shaft pipe component 223 is composed of a metal in this example and is set longer than the length of the ferrite core 222 in the axial center direction. The shaft pipe component 223 includes protruding parts 223a and 223b that stick out from the through-hole 222a of the ferrite core 222 to the pen tip side and the opposite side, respectively. The shaft pipe component 223 is connected and fixed to the ferrite core 222 by an adhesive to reinforce the ferrite core.

The shaft body 21 is configured to be inserted in a through-hole 223c of the shaft pipe component 223 (see a dotted-line part of the shaft pipe component 223 in FIG. 2B) so as to be movable in the axial center direction.

As illustrated in FIG. 2B, the cylindrical part 231 of the holder 23 includes a fitting recess 231a having substantially the same diameter as the diameter of the ferrite core 222, a housing 231b having a housing space in which the writing pressure detector 40 is housed, as will be described in detail later, and a through-hole 231c that penetrates between the fitting recess 231a and the housing 231b and has an inner diameter that is substantially the same diameter as the outer diameter of the protruding part 223b of the shaft pipe component 223 placed opposite the pen tip side.

The ferrite core 222 is connected to the cylindrical part 231 of the holder 23 in the state, in which the ferrite core 222 of the signal transmission component 22 is fitted into the fitting recess 231a and in which the protruding part 223b of the shaft pipe component 223 placed opposite the pen tip side is fitted into the through-hole 231c. As illustrated in FIG. 2B, a pressure transmitting component 50 and a coil spring 60 are disposed in the through-hole 231c of the cylindrical part 231 prior to the ferrite core 222 being connected to the shaft pipe component 223. Due to the elasticity of the coil spring 60, a state is maintained in which the pressure transmitting component 50 constantly abuts against a pressure accepting part of the writing pressure detector 40.

After the ferrite core 222 and the shaft pipe component 223 of the signal transmission component 22 are fitted into the cylindrical part 231 of the holder 23, the shaft body 21 is made to penetrate through the through-hole 223c of the shaft pipe component 223, and an end part 21b of the shaft body 21 is fitted into a fitting recess 50a of the pressure transmitting component 50. By pulling a pen tip part 21a, a user can disengage the shaft body 21 from the pressure transmitting component 50 to pull out the shaft body 21. Therefore, the shaft body 21 is replaceable.

The following describes the holder 23, the writing pressure detector 40 and a circuit board 70 held by the holder 23, and the main unit casing component 24 in reference to FIG. 3, FIG. 4A, and FIG. 4B.

FIG. 3 is an exploded perspective view in which the holder 23, the writing pressure detector 40 and the circuit board 70 held by the holder 23, and the main unit casing component 24 are illustrated in a disassembled manner.

The holder 23 is a boat-shaped component that is elongated in the axial center direction, and includes the above-described cylindrical part 231 on the pen tip side and a coupling part 233 to connect to the mounting adapter 3 on the side opposite to the pen tip side. The holder 23 is composed of an insulating material, specifically a resin in this example. In the holder 23, the circuit board placement base 232 including a flat part 232a, on which the circuit board 70 is to be placed, is set between the cylindrical part 231 and the coupling part 233.

A step part 231d is formed in the cylindrical part 231 of the holder 23. In the holder 23, the length in the axial center direction from the step part 231d to the end part of the coupling part 233 is set substantially the same as the length of the main unit casing component 24 in the axial center direction. The maximum diameter of a portion from the step part 231*d* to the end part of the coupling part 233 is set slightly smaller than the inner diameter of the main unit casing component 24. Therefore, the portion from the step part 231*d* to the end part of the coupling part 233 can be housed in the main unit casing component 24.

When the holder 23 is inserted into the main unit casing component 24, a state is maintained in which the end surface of the main unit casing component 24 on the pen tip side abuts against the step part 231*d*, and another state is maintained in which a part of the cylindrical part 231 of the holder 23 with a smaller outer diameter, the circuit board placement base 232, and the coupling part 233 are housed in the main unit casing component 24.

As illustrated in FIG. 3, the housing 231*b* in the part of the cylindrical part 231 of the holder 23 having the smaller outer diameter includes an opening part 231*bm* in the direction orthogonal to the flat part 232*a* of the circuit board placement base 232. Into the housing 231*b*, the writing pressure detector 40 is inserted, through the opening part 231*bm*, in a direction orthogonal to the axial center direction.

In this embodiment, on the surface (curved surface) opposite to the flat part 232*a* of the holder 23, as illustrated in FIG. 2A, two terminal components 234 and 235 for connecting one end 221*a* and the other end 221*b* of the coil 221 to the circuit board 70 are formed. In the illustrated example, the two terminal components 234 and 235 are formed as a three-dimensional fine pattern formed by using a molded interconnect device (MID) technique from the pen tip side across the step part 231*d* to a middle portion of the circuit board placement base 232 in the axial center direction. The terminal components 234 and 235 are formed in such a manner that end parts 234*a* and 235*a* thereof appear also on the flat part 232*a* of the circuit board placement base 232 as illustrated in FIG. 3.

Next, the circuit board 70 will be described. As illustrated in FIG. 3, the circuit board 70 is formed of a flexible substrate 71 having an elongated shape. The circuit board 70 includes, along the longitudinal direction of the flexible substrate 71, circuit elements for generating writing pressure information from a detection output of the writing pressure detector 40, a circuit placement part 72 including circuit elements that form a circuit (in this example, a resonant circuit) for sending out a position detection signal to a position detecting device, a writing pressure detector placement part 73 on which the writing pressure detector 40 is placed, and a line part 74 disposed between the circuit placement part 72 and the writing pressure detector placement part 73.

In the circuit placement part 72 of the flexible substrate 71, as illustrated in FIG. 3, a capacitor 75 that is connected in parallel to the coil 221 of the signal transmission component 22 to configure a resonant circuit is disposed. A conductor pattern (illustration is omitted) that configures the resonant circuit is formed by connecting the coil 221 and the capacitor 75 in parallel.

Although illustration is omitted, a line pattern for connecting, in parallel to the parallel resonant circuit of the coil 221 and the capacitor 75, the writing pressure detector 40 placed on the writing pressure detector placement part 73 is formed in the line part 74.

In this example, a double-sided tape (illustration is omitted) is stuck to the other surface side (back surface side) of the circuit placement part 72 of the flexible substrate 71 of the circuit board 70. By the double-sided tape, the flexible substrate 71 is bonded and fixed onto the flat part 232*a* of the circuit board placement base 232 of the holder 23.

In this example, the writing pressure detector 40 is formed as a unitary part configured as a package by using a micro-electro-mechanical system (MEMS) element that detects, as a change in capacitance, the pressure applied to the shaft body.

FIG. 4A and FIG. 4B are diagrams illustrating the configuration of the writing pressure detector 40 in this example. FIG. 4A is a plan view as viewed from the pressure accepting part side thereof. FIG. 4B is a sectional view along line A-A in FIG. 4A.

The writing pressure detector 40 of this example is obtained by sealing a pressure sensing chip 41 configured as a semiconductor device fabricated by the MEMS technique, in a package 42 having a rectangular parallelepiped box shape, for example.

The pressure sensing chip 41 detects the applied pressure as a change in the capacitance. The pressure sensing chip 41 of this example is formed into a rectangular parallelepiped shape of depth×width×height=L1×L1×H1.

The pressure sensing chip 41 of this example includes a first electrode 411, a second electrode 412, and an insulating layer (dielectric layer) 413 disposed between the first electrode 411 and the second electrode 412.

On the surface side of the insulating layer 413 that faces the first electrode 411, in this example, a circular recess 414 centered at the central position of this surface is formed. Because of the recess 414, a space 415 is formed between the insulating layer 413 and the first electrode 411.

In the pressure sensing chip 41 having the above-described configuration, a capacitor 40C is formed between the first electrode 411 and the second electrode 412. When a pressure is applied to the first electrode 411 from the side of a surface 411*a* of the first electrode 411 that is opposite to the surface facing the second electrode 412, the first electrode 411 bends, and the distance between the first electrode 411 and the second electrode 412 is shortened, so that the value of the capacitance of the capacitor 40C changes to become larger. The amount of bending of the first electrode 411 changes according to the magnitude of the applied pressure, and the capacitor 40C serves as a variable-capacitance capacitor based on the magnitude of the pressure applied to the pressure sensing chip 41.

In the writing pressure detector 40 of this embodiment, the pressure sensing chip 41 having the above-described configuration is housed in the package 42 in a state in which the surface 411*a* of the first electrode 411 that receives a pressure serves as the pressure acceptance side.

As illustrated in FIG. 4B, to the bottom surface of a package component 421 of the writing pressure detector 40 on the side opposite to the pressure acceptance side, a first lead terminal 43 connected to the first electrode 411 of the pressure sensing chip 41 is led out, and a second lead terminal 44 connected to the second electrode 412 of the pressure sensing chip 41 is led out.

The writing pressure detector 40 is placed on and fixed to the writing pressure detector placement part 73 of the flexible substrate 71 in such a manner that the first lead terminal 43 and the second lead terminal 44 of the writing pressure detector 40 are each electrically connected to a conductor pattern formed on the writing pressure detector placement part 73 of the circuit board 70.

In this manner, when the writing pressure detector 40 is placed on the writing pressure detector placement part 73 and is electrically connected and fixed thereto, the circuit board 70 comes into the state in which the capacitor 75 forming a resonant circuit with the coil 221 and the variable-capacitance capacitor 40C including the writing pressure detector 40 are connected in parallel.

In the flexible substrate 71, as illustrated in FIG. 3, the writing pressure detector placement part 73 on which the writing pressure detector 40 is placed is inserted and housed in the housing 231b from the direction that is orthogonal to the axial center direction and is orthogonal to the flat part 232a of the circuit board placement base 232 of the holder 23, through the opening part 231bm of the cylindrical part 231 of the holder 23. As illustrated in FIG. 2B, the circuit board 70 is folded at the line part 74, and the circuit placement part 72 is pressed against the side of the flat part 232a of the circuit board placement base 232 of the holder 23.

By the double-sided tape disposed on the back surface side of the flexible substrate 71 of the circuit board 70, the writing pressure detector placement part 73 is bonded and fixed to the surface of a wall part 231e on the side of the housing 231b, and the circuit placement part 72 is bonded and fixed onto the flat part 232a of the circuit board placement base 232 of the holder 23. A projection 232b for clamping and locking an end part of the circuit board 70 in the longitudinal direction is formed on the rear end side of the circuit board placement base 232. The circuit board 70 is disposed on the flat part 232a of the circuit board placement base 232 in such a manner that the end part of the circuit board 70 is clamped between the projection 232b and the flat part 232a of the circuit board placement base 232.

The coupling part 233 of the holder 23 includes a circular columnar recess 2331 having an opening on the side to be connected to the mounting adapter 3, as indicated by dotted lines in FIG. 3. The inner diameter of the circular columnar recess 2331 of the coupling part 233 is set slightly larger than the outer diameter of the rod-shaped components 32A, 32B, and 32C of the mounting adapters 3A, 3B, and 3C to allow insertion of any of the rod-shaped components 32A, 32B, and 32C of the mounting adapters 3A, 3B, and 3C.

At positions separate from each other by an angular interval of 180 degrees in the side circumferential surface of the circular columnar recess 2331 of the coupling part 233, through-holes 2332 and 2333 are formed to allow the projections 36A and 37A, the projections 36B and 37B, or the projections 36C and 37C to enter when the rod-shaped component 32A, 32B, or 32C of the mounting adapter 3A, 3B, or 3C is inserted into the circular columnar recess 2331. In this case, the length of the through-holes 2332 and 2333 in the direction along the axial center direction is selected to be longer than the length of the projections 36A and 37A, the projections 36B and 37B, and the projections 36C and 37C of the rod-shaped components 32A, 32B, and 32C of the mounting adapters 3A, 3B, and 3C in the direction along the axial center direction.

The depth (length in the axial center direction) of the circular columnar recess 2331 of the coupling part 233 is set to allow the rod-shaped components 32A, 32B, and 32C of the mounting adapters 3A, 3B, and 3C to be inserted into the circular columnar recess 2331 by a length for which the coil springs 33A, 33B, and 33C can be contracted.

Therefore, by inserting the rod-shaped components 32A, 32B, and 32C into the circular columnar recess 2331 of the coupling part 233 of the holder 23, the mounting adapters 3A, 3B, and 3C are connected to the coupling part 233 of the holder 23 and are locked as illustrated in FIG. 5A to FIG. 5C. It is to be noted that FIG. 5A to FIG. 5C are illustrated as the case in which the mounting adapter 3A is connected to the holder 23.

Specifically, when the rod-shaped component 32A of the mounting adapter 3A is inserted into the circular columnar recess 2331 of the coupling part 233 of the holder 23 as illustrated in FIG. 5A, the projections 36A and 37A retract to the inside of the rod-shaped component 32A against the elastic force of the elastic component 39A. Therefore, the rod-shaped component 32A of the mounting adapter 3A can be deeply inserted in the circular columnar recess 2331 as illustrated in FIG. 5B. In this case, the rod-shaped component 32A of the mounting adapter 3A is inserted into the circular columnar recess 2331 of the coupling part 233 of the holder 23 and is rotated as indicated by an arrow RT. When the positions of the projections 36A and 37A correspond to the positions of the through-holes 2333 and 2332 through the rotation, the projections 36A and 37A protrude.

Then, in the state in which the position adjustment has been completed, the force to push the mounting adapter 3A into the circular columnar recess 2331 is removed. Then, as illustrated in FIG. 5C, the mounting adapter 3A is displaced in a direction to move away from the circular columnar recess 2331 of the coupling part 233, by the elastic force of the coil spring 33A. However, the projections 36A and 37A protrude into spaces corresponding to the thickness of the through-holes 2333 and 2332, and therefore, walls of the through-holes 2333 and 2332 engage with the projections 36A and 37A. The mounting adapter 3A is thus locked. In this state, by the elastic force of the coil spring 33A, forces to move away from each other act between the mounting adapter 3A and the holder 23, and the mounting adapter 3A and the holder 23 are firmly connected with each other without looseness in the axial center direction.

To separate the mounting adapter 3A from the holder 23 by releasing the connection to the coupling part 233 of the holder 23, the mounting adapter 3A is pushed into the circular columnar recess 2331 again, and the projections 36A and 37A of the mounting adapter 3A are set to positions at which the through-holes 2333 and 2332 are not provided, to retract to the inside of the rod-shaped component 32A against the elastic force of the elastic component 39A. Then, the mounting adapter 3A is rotated around the axial center direction, and the positions of the projections 36A and 37A are shifted from the positions of the through-holes 2333 and 2332. Then, the mounting adapter 3A can be pulled out from the coupling part 233 of the holder 23.

The other mounting adapters 3B and 3C can be connected to the coupling part 233 of the holder 23 in a similar manner.

It is to be noted that, in practice, the above attachment and detachment of the mounting adapter 3A to and from the coupling part 233 of the holder 23 are carried out in a state in which the part of the cylindrical part 231 of the holder 23 excluding the part having the larger outer diameter is inserted in the main unit casing component 24.

Specifically, the writing pressure detector 40 is housed in the holder 23, and the circuit board 70 is held in the above-described manner. Thereafter, the holder 23 is inserted into the main unit casing component 24 from the side opposite to the cylindrical part 231, and a state is maintained in which the end surface of the main unit casing component 24 on the pen tip side abuts against the step part 231d of the cylindrical part 231 of the holder 23. As a result, the holder 23 is connected to the main unit casing component 24 in a state in which the through-holes 2332 and 2333 of the coupling part 233 are covered by the main unit casing component 24. At this time, the end part of the coupling part 233 of the holder 23 on the opening side is either placed at substantially the same position as the end part of the opening of the main unit casing component 24 on the rear end side or is slightly protruding from the end part of the opening of the main unit casing component 24 on the rear end side.

Thereafter, the pressure transmitting component 50 around which the coil spring 60 is wound is inserted into the through-hole 231*c* of the cylindrical part 231 of the holder 23. Then, the ferrite core 222 and the shaft pipe component 223 of the signal transmission component 22 are inserted and fitted into the cylindrical part 231 of the holder 23 to connect the signal transmission component 22 to the holder 23. Then, as illustrated in FIG. 2A, the one end 221*a* and the other end 221*b* of the coil 221 wound around the ferrite core 222 of the signal transmission component 22 are electrically connected to the terminal components 234 and 235, respectively, that are formed on the cylindrical part 231 of the holder 23, by soldering or the like, for example.

Thereafter, the shaft body 21 is inserted into the through-hole 223*c* of the shaft pipe component 223, and the end part 21*b* of the shaft body 21 is inserted and fitted into the fitting recess 50*a* of the pressure transmitting component 50. In this way, the electronic pen main unit 2 is completed.

The mounting adapter 3 (3A, 3B, 3C) is inserted and connected in the above-described manner from the opening side, that is, the rear end side, of the main unit casing component 24 of the electronic pen main unit 2, so that the electronic pen cartridge 1 is completed.

In this embodiment, the writing pressure detector 40 has a semiconductor device including the MEMS. In general, the writing pressure to be applied by the user of the electronic pen is set in a range of 0 to 500 g, for example, and the writing pressure detector 40 is configured to detect the writing pressure within the range accurately.

However, there is a possibility that the writing pressure detector 40 may be damaged when a pressure beyond the above-described range of the writing pressure that should be detected is applied, particularly in the case in which a high shock load is applied when the electronic pen is dropped or the like.

In this embodiment, the coil springs 33A, 33B, and 33C of the mounting adapters 3A, 3B, and 3C play a role of a shock absorber (shock absorbing component) when such shock load is applied.

Specifically, the coil springs 33A, 33B, and 33C of the mounting adapters 3A, 3B, and 3C have such an elastic force as not to cause elastic displacement in the range of the writing pressure that should be detected, and as to be elastically displaced when a load beyond the range is applied. In this case, the coil springs 33A, 33B, and 33C have the above-described elastic force through selection of the material, the thickness of the wire that is wound, and so forth, regarding the coil springs 33A, 33B, and 33C.

As described later, when position indication is carried out by a user while a writing pressure is applied on a position detecting sensor of a position detecting device in the usage state in which the electronic pen cartridge 1 of this embodiment is mounted on a mounting part in the casing of an electronic pen and in which the pen tip part 21*a* of the shaft body 21 protrudes outside, the coil spring 33A, 33B, or 33C of the mounting adapter 3A, 3B, or 3C is not elastically displaced in the detection range of the writing pressure. Therefore, the writing pressure applied to the pen tip part 21*a* of the shaft body 21 of the electronic pen cartridge 1 is accurately detected by the writing pressure detector 40.

Further, in this state, when a shock load is applied to the pen tip part 21*a* of the shaft body 21, such as the case in which the user drops the electronic pen, the shock load is absorbed through elastic displacement of the coil spring

33A, 33B, or 33C of the mounting adapter 3A, 3B, or 3C, and damage to the writing pressure detector 40 is prevented.

Embodiments of Electronic Pen

Next, several embodiments of an electronic pen will be described, in which the electronic pen cartridge 1 configured as described above may be mounted.

Examples of Multicolor Pen

Figures 6A, 6B:
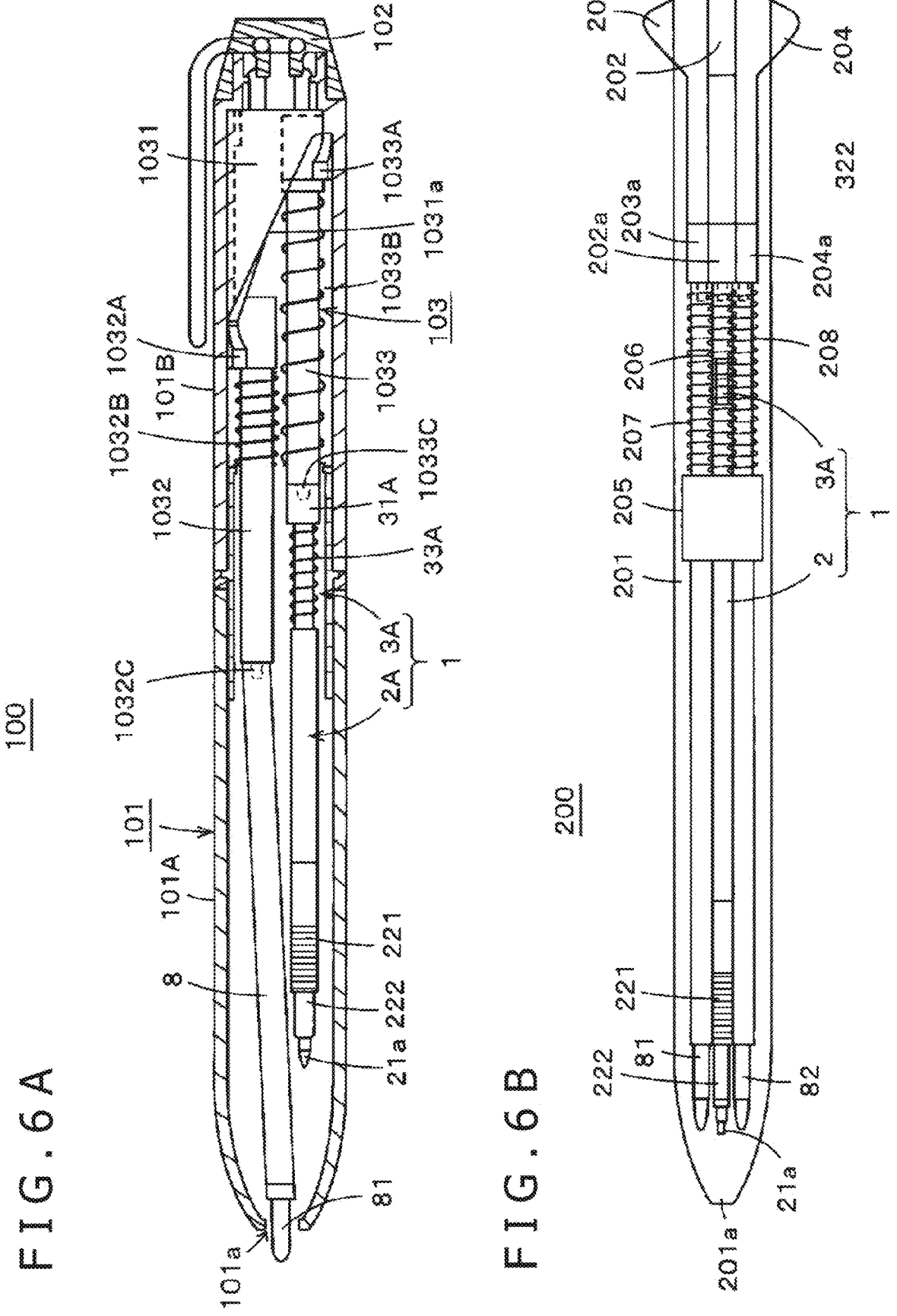
FIG. 6A and FIG. 6B are diagrams illustrating configuration examples of an embodiment of an electronic pen.

FIG. 6A and FIG. 6B illustrate examples of a multicolor pen that are embodiments of the electronic pen in which the electronic pen cartridge 1 is mounted. In the examples of the embodiments of the electronic pen illustrated in FIG. 6A and FIG. 6B, a case is described in which the mounting adapter 3A is connected to the electronic pen main unit 2 in the mounted electronic pen cartridge 1. FIG. 6A is an example of a structure in which the electronic pen cartridge 1 is let out on the basis of a rotation system. FIG. 6B is an example of a structure in which the electronic pen cartridge 1 is let out on the basis of a slide system by a knock bar. First, an electronic pen 100 of the example in FIG. 6A will be described.

In the electronic pen 100 of the example illustrated in FIG. 6A, two components, that is, the electronic pen cartridge 1 of the embodiment and a pen refill (cartridge or refill) 8 of a ballpoint pen as a writing implement, are housed in a hollow part of a cylindrical casing 101 having a pen shape. An opening 101*a* is formed on the pen tip side of one end part of the cylindrical casing 101 in the axial center direction. An opening on the side (rear end side) opposite to the pen tip side is closed by a rear end lid 102.

The electronic pen 100 of this example includes a switching mechanism part 103 of a rotation system and is configured to switch to either the pen tip part of the electronic pen main unit 2 or the pen tip part of the pen refill 8 of the ballpoint pen by the switching mechanism part 103 of the rotation system, to thereby allow the selected pen tip part to protrude outside from the opening 101*a* of the casing 101 of the electronic pen 100.

The casing 101 of the electronic pen 100 of this embodiment is divided into two casings, that is, a pen-tip-side casing 101A and a rear-end-side casing 101B.

On the side of the rear end lid 102 in the rear-end-side casing 101B, a triangular cam 1031 having an outer diameter that corresponds to the inner diameter of the rear-end-side casing 101B is disposed. The triangular cam 1031 is formed into a shape having an inclined part 1031*a* obtained by obliquely cutting a circular cylindrical component from an upper surface part thereof to a bottom surface part thereof. When the rear-end-side casing 101B is rotated with respect to the pen-tip-side casing 101A, the triangular cam 1031 rotates together in a linked manner.

At end parts of a pushing-out bar 1032 and a pushing-out bar 1033 on the tip side, mounting parts 1032C and 1033C that are connected to a coupling part of the refill 8 of the ballpoint pen on the rear end side and the coupling part 31A of the mounting adapter 3A of the electronic pen cartridge 1 are formed.

In the electronic pen 100 configured as described above, the triangular cam 1031 rotates together with the rear-end-side casing 101B when the rear-end-side casing 101B is rotated with respect to the pen-tip-side casing 101A around the axial center position of the external casing 101. In response to this, slide parts 1032A and 1033A disposed at end parts of the pushing-out bars 1032 and 1033 on the rear end side move by sliding on the end surface of the triangular cam 1031.

Thus, a pen tip part 81 of the refill 8 of the ballpoint pen or the pen tip part 21*a* of the shaft body 21 of the electronic pen cartridge 1 fitted to the pushing-out bar 1032 or the pushing-out bar 1033 that moves to the tip side of the triangular cam 1031 is pushed out to the side of the opening 101*a* of the pen-tip-side casing 101A to protrude from the opening 101*a* of the pen-tip-side casing 101A. Simultaneously, for the electronic pen cartridge 1 or the refill 8 of the ballpoint pen having the pen tip part that does not protrude from the opening 101*a*, the pushing-out bar 1033 or the pushing-out bar 1032 to which it is connected moves to the rear end side of the triangular cam 1031 while being drawn to the rear end side of the electronic pen 100 by a spring 1033B or a spring 1032B. Thus, the electronic pen cartridge 1 or the refill 8 of the ballpoint pen is housed in the external casing 101.

In this case, as illustrated in FIG. 6A, the electronic pen cartridge 1 and the pen refill 8 of the ballpoint pen are housed in the external casing 101 at positions that deviate (are offset) from the center line position of the external casing 101. For this reason, the tip parts of the electronic pen cartridge 1 and the pen refill 8 of the ballpoint pen are let out from the opening 101*a* of the casing 101 when the electronic pen cartridge 1 and the pen refill 8 of the ballpoint pen receive not only a force in the axial center direction but also a force in a direction orthogonal to the axial center direction, as illustrated in FIG. 6A.

The pen refill 8 of the ballpoint pen includes a component made of a resin having elasticity and thus easily bends when receiving such a force in a direction orthogonal to the axial center direction. Therefore, the pen refill 8 may be easily let out from the opening 101*a*.

On the other hand, the main unit casing component 24 of the electronic pen main unit 2 of the electronic pen cartridge 1 is composed of a hard material, specifically a metal in this example, because the circuit board 70, the writing pressure detector 40, and so forth are housed inside it. Therefore, the main unit casing component 24 bends less readily than the refill 8 of the ballpoint pen.

However, in the electronic pen cartridge 1 of this embodiment, the rod-shaped component 32A of the mounting adapter 3A connected to the electronic pen main unit 2 is composed of a resin having elasticity that allows displacement also in the direction orthogonal to the axial center direction. This achieves bending displacement at the rod-shaped component 32A according to the force in the direction orthogonal to the axial center direction.

As a result, in the pen-tip-side casing 101A and the rear-end-side casing 101B, even when the electronic pen cartridge 1 abuts against the inner wall of the pen-tip-side casing 101A, the electronic pen cartridge 1 can be moved for protrusion and retraction from the opening 101*a* of the external casing 101 without application of a high load that bends the main unit casing component 24 of the electronic pen main unit 2.

Next, an electronic pen 200 of the example in FIG. 6B will be described. In this example of FIG. 6B, the electronic pen 200 includes a cylindrical casing 201 that has a pen shape and is composed of a transparent synthetic resin, and the cylindrical casing 201 is illustrated in a state in which the inside thereof is visible in a see-through manner. In the example in FIG. 6B, the electronic pen cartridge 1 of the above-described embodiment and pen refills 81 and 82 of a ballpoint pen are housed in the casing 201.

The casing 201 of the electronic pen 200 of the example in FIG. 6B has the same configuration as a casing and a knock mechanism of a commercially-available knock-type three-color ballpoint pen. The casing 201 may use the casing and the knock mechanism of a commercially-available knock-type three-color ballpoint pen as they are.

In the casing 201, knock bars 202, 203, and 204 having mounting parts 202*a*, 203*a*, and 204*a* of the electronic pen cartridge 1 and the pen refills 81 and 82 of the ballpoint pens are included. Further, a guide component 205 fixed to the casing 201 is disposed at the middle of the casing 201 in the axial center direction. In the guide component 205, through-holes are made, into which the electronic pen cartridge 1 and the pen refills 81 and 82 of the ballpoint pens are inserted. A return spring 206 is disposed between the mounting part 202*a* of the knock bar 202 and the guide component 205. A return spring 207 is disposed between the mounting part 203*a* of the knock bar 203 and the guide component 205. A return spring 208 is disposed between the mounting part 204*a* of the knock bar 204 and the guide component 205.

In the electronic pen 200 of this example, the mounting adapter 3A of the electronic pen cartridge 1 is fitted and mounted on the mounting part 202*a* of the knock bar 202. The pen refill 81 of the ballpoint pen of, for example, black ink is fitted and mounted on the mounting part 203*a* of the knock bar 203. The pen refill 82 of the ballpoint pen of, for example, red ink is fitted and mounted on the mounting part 204*a* of the knock bar 204.

When any of the knock bars 202, 203, and 204, for example, the knock bar 203 here, is moved by sliding to the pen tip side, the tip part of the pen refill 81 of the ballpoint pen protrudes from an opening 201*a* of the casing 201. Thereafter, when, for example, the knock bar 202 is moved by sliding to the pen tip side, the knock bar 203 on which the pen refill 81 of the ballpoint pen, whose tip part protruded from the opening 201*a* previously, is mounted returns to the original state prior to the sliding, by the return spring 207. At the same time, the tip part of the electronic pen cartridge 1 mounted on the knock bar 202 that is moved by sliding will protrude from the opening 201*a*. The above-described operation may be repeated by moving any of the knock bars 202, 203, and 204 by sliding.

In the electronic pen 200 of the example in FIG. 6B, when the knock bar 202 is moved by sliding, the tip part of the electronic pen cartridge 1 is let out from the opening 201*a* of the casing 201 while the electronic pen cartridge 1 receives not only a force in the axial center direction but also a force in a direction orthogonal to the axial center direction, similarly to the case of the electronic pen 100 in FIG. 6A, because the housing position of the electronic pen cartridge 1 in the casing 201 deviates (is offset) from the center line position of the casing.

In the electronic pen cartridge 1 of this embodiment, the rod-shaped component 32A of the mounting adapter 3A connected to the electronic pen main unit 2 is composed of a resin having elasticity that allows displacement also in the direction orthogonal to the axial center direction. Therefore, bending displacement can be made according to the force in the direction orthogonal to the axial center direction, at the part of the rod-shaped component 32A. Thus, the electronic pen cartridge 1 can be moved for protrusion and retraction from the opening 201*a* of the casing 201 without application of a high load that bends the main unit casing component 24 of the electronic pen main unit 2.

Further, as described above, in the electronic pen 100 of the example in FIG. 6A and the electronic pen 200 of the example in FIG. 6B, even when the electronic pen 100 or the electronic pen 200 is dropped in the state in which the tip part of the electronic pen cartridge 1 protrudes from the opening 101a of the casing 101 or the opening 201a of the casing 201 and a shock load is then applied to the tip part of the electronic pen cartridge 1, the coil spring 33A of the mounting adapter 3A of the electronic pen cartridge 1 functions as a shock absorber, so that damage to the writing pressure detector 40 is prevented.

In the examples of the FIG. 6A and FIG. 6B above, the case is described in which the mounting adapter 3A is connected to the electronic pen main unit 2 in the electronic pen cartridge 1. However, in some cases, the mounting adapter 3B is connected to the electronic pen main unit 2 according to the configuration of the mounting part disposed in the casing 101 or the casing 201. Operation and effects similar to those described above are obtained also in this case.

Example of Knock-Type Ballpoint Pen

Next, an example of a knock-type electronic pen 300 is illustrated in FIG. 7. In the case of this example of FIG. 7, the electronic pen cartridge 1 in which the mounting adapter 3C is mounted on the electronic pen main unit 2 is mounted and housed in a hollow part of a casing 301 of the electronic pen 300.

The casing 301 of the electronic pen 300 of this example has a knock-type configuration that causes the tip part of the electronic pen cartridge 1 (pen tip part 21a of the shaft body 21 and a portion of the ferrite core 222) to protrude and retract from an opening 301a of the casing 301. Thus, a knock cam mechanism part 302 is included in the casing 301. In the example in FIG. 7, the casing 301 of the electronic pen 300 is composed of a transparent synthetic resin and is illustrated in a state in which the inside thereof is visible in a see-through manner. The casing 301 of the electronic pen 300 of this example is configured to establish compatibility with a commercially-available knock-type ballpoint pen.

The knock cam mechanism part 302 disposed in the casing 301 has the same configuration as a knock cam mechanism part of a well-known commercially-available knock-type ballpoint pen. The dimensional relation is also identically configured. Therefore, it is also possible to use a casing and a knock cam mechanism part of a commercially-available knock-type ballpoint pen as they are, as the casing 301 and the knock cam mechanism part 302.

The knock cam mechanism part 302 has a well-known configuration in which a cam main body 303, a knock bar 304, and a rotor 305 are combined as illustrated in FIG. 7. The rotor 305 includes a mounting part 305a to which the coupling part 31C of the mounting adapter 3C of the electronic pen cartridge 1 is connected and mounted.

In FIG. 7, when an end part 304a of the knock bar 304 is pressed down, the electronic pen cartridge 1 comes into the state in which its pen tip side protrudes from the opening 301a of the casing 301 by the knock cam mechanism part 302. When the end part 304a of the knock bar 304 is pressed down again in the state in which the tip part of the electronic pen cartridge 1 protrudes, the locking state in which the tip part protrudes is released by the knock cam mechanism part 302, and the position of the electronic pen cartridge 1 in the casing 301 returns to the state of FIG. 7 by a return spring 306. The detailed configuration of the knock cam mechanism part 302 and operation thereof are well known, and therefore, the description thereof is omitted here.

In the electronic pen 300 of the example of FIG. 7, even when the electronic pen 300 is dropped in the state in which the tip part of the electronic pen cartridge 1 protrudes from the opening 301a of the casing 301 and a shock load is then applied to the tip part of the electronic pen cartridge 1, the coil spring 33C of the mounting adapter 3C of the electronic pen cartridge 1 functions as a shock absorber, so that damage to the writing pressure detector 40 is prevented.

Further, in the electronic pens 100, 200, and 300, the coil springs 33A, 33B, and 33C of the mounting adapters 3A, 3B, and 3C are configured in such a manner as not to be elastically displaced within the writing pressure detection range of the writing pressure detector 40. Therefore, the writing pressure can be detected properly.

Circuit Configuration of Position Detecting Device
Used with Electronic Pen 100, 200, or 300 for
Position Detection and Writing Pressure Detection FIG. 8 is a diagram illustrating the electronic circuit configuration of a position detecting device 800 used with the electronic pen 100, 200, or 300 of this embodiment. The position detecting device 800 of this embodiment performs exchange of signals (interaction) with the above-described resonant circuit of the electronic pen cartridge 1 mounted in the electronic pen 100, 200, or 300, by an electromagnetic induction system for example.

As illustrated in FIG. 8, the electronic pen cartridge 1 includes a resonant circuit RC of the coil 221, the capacitor 75, and the variable-capacitance capacitor 40C including the writing pressure detector 40, and the resonant circuit RC forms an electromagnetic inductive coupling with a position detecting sensor.

A position detecting sensor 810 of the position detecting device 800 includes position detecting coils in which an X-axis-direction loop coil group 811 and a Y-axis-direction loop coil group 812 are layered together. The position detecting device 800 transmits a signal to the resonant circuit RC formed of the coil 221 and the capacitor 75 in the electronic pen cartridge 1 through the position detecting sensor 810 by electromagnetic coupling. The electronic pen cartridge 1 feeds back the signal received from the position detecting device 800, to the position detecting sensor 810 of the position detecting device 800 through the resonant circuit RC.

Then, in the position detecting device 800, the feedback signal from the resonant circuit RC of the electronic pen cartridge 1 is received by electromagnetic coupling, and the position on the position detecting sensor 810 indicated by the electronic pen cartridge 1 is detected from the position on the position detecting sensor 810 at which the received signal is detected. In addition, a change in the resonant frequency of the resonant circuit RC is detected by detecting a phase change of the signal received from the resonant circuit RC of the electronic pen cartridge 1 by electromagnetic coupling, and the writing pressure applied to the shaft body 21 of the electronic pen cartridge 1 is detected.

In a transmission-reception processing circuit 820, a selection circuit 813 is disposed, to which the X-axis-direction loop coil group 811 and the Y-axis-direction loop coil group 812 of the position detecting sensor 810 are connected. The selection circuit 813 sequentially selects one loop coil from the two loop coil groups 811 and 812 to transmit a signal to the resonant circuit RC and receive a signal fed back from the resonant circuit RC.

A switching circuit 823, for which switching control is carried out by a processing control section 827, is connected to the selection circuit 813. When the switching circuit 823 is connected to a transmission-side terminal T, an alternating-current signal is supplied from an oscillator 821 to the selection circuit 813. When the switching circuit 823 is connected to a reception-side terminal R, a signal from the selection circuit 813 is supplied through an amplifier 824 to a circuit 825 for indicated position detection and to a circuit 826 for writing pressure detection.

The circuit 825 for indicated position detection carries out detection of an induced voltage generated in the loop coil, i.e., a received signal, and converts a detection output signal thereof to a digital signal, and outputs the digital signal to the processing control section 827. The processing control section 827 calculates the coordinate values of the position indicated by the electronic pen cartridge 1 in the X-axis direction and the Y-axis direction, on the basis of the digital signal from the circuit 825 for indicated position detection, i.e., on the basis of the level of the voltage value of the induced voltage generated in each loop coil.

Meanwhile, the circuit 826 for writing pressure detection carries out synchronous detection of an output signal of the receiving amplifier 824 with the alternating-current signal from the oscillator 821 and obtains a signal with a level based on the phase difference (frequency deviation) between them. Then, the circuit 826 for writing pressure detection converts a signal based on the phase difference (frequency deviation), to a digital signal, and outputs the digital signal to the processing control section 827. The processing control section 827 detects the writing pressure applied to the electronic pen cartridge 1, on the basis of the digital signal from the circuit 826 for writing pressure detection, i.e., the level of the signal based on the phase difference (frequency deviation) between the transmitted radio wave and the received radio wave.

Effects of the Electronic Pen Cartridge

As described above, according to the electronic pen cartridge 1 of the above-described embodiment, the configuration is made in such a manner that the mounting adapter 3A, 3B, or 3C can be replaced and connected to the electronic pen main unit 2. Therefore, it is possible to establish compatibility with various types of casings of the electronic pen different in the structure of the mounting part on which the electronic pen cartridge 1 is mounted. In addition, the electronic pen cartridge 1 can be mounted in the casings of various electronic pens different in the length in the axial center direction, which is very convenient.

Further, in this case, it is sufficient to purchase one electronic pen main unit 2 and replace the mounting adapter according to the casing of the electronic pen. Therefore, for the user, there is no need to purchase the expensive electronic pen main unit for each of different types of casing, so that the burden in terms of cost is alleviated.

In addition, the mounting adapters 3A, 3B, and 3C include the coil springs 33A, 33B, and 33C, and an elastic force is applied to constantly separate (push) the mounting adapter 3A, 3B, or 3C and the electronic pen main unit 2 away from each other when the mounting adapter 3A, 3B, or 3C is connected to the electronic pen main unit 2. Therefore, looseness at the coupling part of the mounting adapter 3A, 3B, or 3C and the electronic pen main unit 2 is avoided. In addition, the coil springs 33A, 33B, and 33C are configured in such a manner as not to be elastically displaced within the writing pressure detection range of the writing pressure detector 40 mounted in the electronic pen main unit 2 and as to be elastically displaced when a load (shock load) that exceeds the writing pressure detection range is applied. Therefore, the coil springs 33A, 33B, and 33C serve as a shock absorber when the shock load is applied to the tip of the electronic pen cartridge 1, so that damage to the writing pressure detector 40 can be prevented.

Other Embodiments and Modification Examples

The above embodiment is described by using the case of the electronic pen (electronic pen cartridge) of the electromagnetic induction system. However, the present disclosure can also be applied to an electronic pen of the active capacitive coupling system that indicates a position by transmitting a predetermined signal to a position detecting device by the capacitive coupling system. In this case, the mounting adapters 3A, 3B, and 3C have a configuration similar to that of the above-described embodiment, and the configuration of the electronic pen main unit 2 is different.

Specifically, the shaft body 21 is composed of an electrically-conductive component such as a metal having electrical conductivity. The coil 221 wound around the ferrite core 222 is not required, and the resonant circuit RC does not need to be included. In addition, on the circuit board, a signal transmitting circuit for supplying a signal to the electrically-conductive shaft body is disposed instead of disposing the capacitor 75 that forms the resonant circuit RC.

However, also in this electronic pen of the active capacitive coupling system, the coil 221 wound around the ferrite core 222 can be configured as a circuit for obtaining a charging current to charge an electricity storing element by the electromagnetic induction system. Further, a configuration of an electrical connection for supplying the signal from the signal transmitting circuit of the circuit board to the shaft body may be added. Therefore, in the case of the capacitive coupling system, the shaft body having electrical conductivity and the signal transmitting circuit are included as the signal transmission component 22 of the electronic pen main unit 2.

An example of an electronic circuit formed on a circuit board of an electronic pen cartridge 1A of the capacitive coupling system of this example will be described with reference to FIG. 9.

Figure 9:
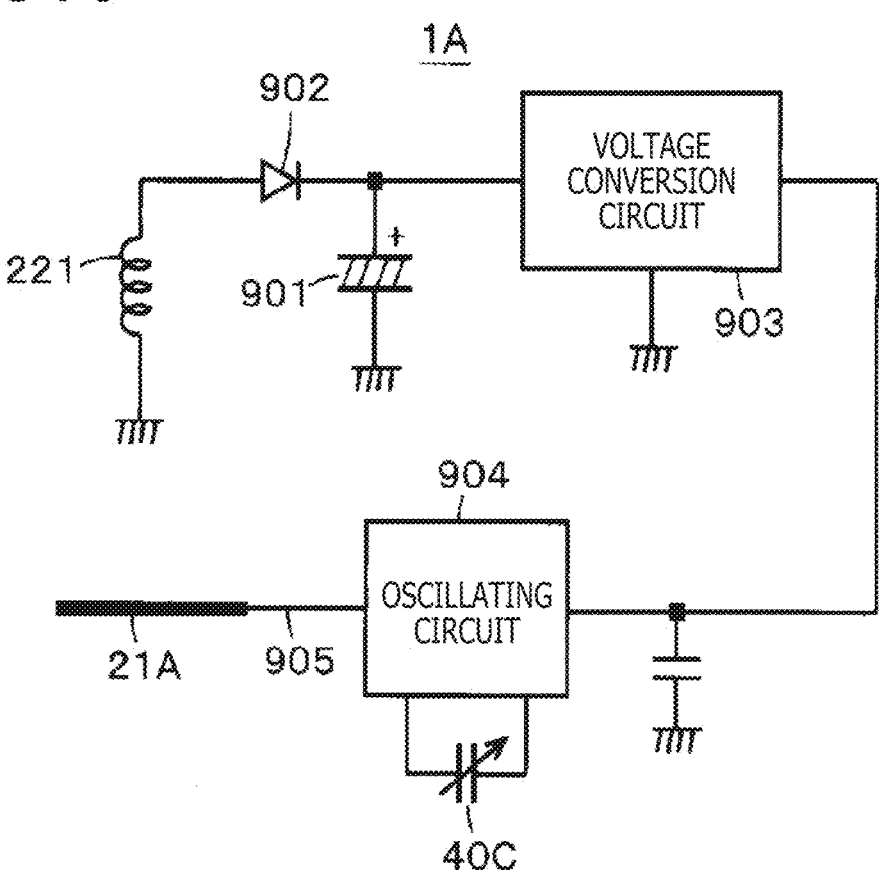
FIG. 9 is a diagram illustrating an electronic circuit example of another embodiment of the electronic pen cartridge according to the present disclosure.

In FIG. 9, a reference sign 901 denotes an electric double-layer capacitor. A reference sign 902 denotes a diode for rectification. A reference sign 903 denotes a voltage conversion circuit. A reference sign 904 denotes an oscillating circuit that configures the signal transmitting circuit of this example. As illustrated in FIG. 9, in this example, one end of the coil 221 is connected to the anode of the diode 902, and the other end of the coil 221 is grounded (GND). Further, one end of the electric double-layer capacitor 901 is connected to the cathode of the diode 902, and the other end of the electric double-layer capacitor 901 is grounded.

The oscillating circuit 904 generates a signal with a frequency that changes according to the capacitance of the variable-capacitance capacitor 40C of the writing pressure detector 40, and supplies the generated signal to an electrode core 21A. The signal from the oscillating circuit 904 is radiated from the electrode core 21A, as an electric field based on the signal. The oscillating circuit 904 includes an LC oscillator circuit that uses resonance between a coil and a capacitor, for example. In a tablet that detects the coordinate position indicated by the electronic pen cartridge 1A of this embodiment, the writing pressure applied to the electrode core 21A can be obtained from the frequency of this signal.

The voltage conversion circuit 903 converts the voltage stored in the electric double-layer capacitor 901, to a certain voltage, and supplies the converted voltage as a power supply of the oscillating circuit 904. The voltage conversion circuit 903 may be of a buck type in which the certain voltage is lower than the voltage across the electric double-layer capacitor 901 or may be of a boost type in which the certain voltage is higher than the voltage across the electric double-layer capacitor 901. The voltage conversion circuit 903 may be of a buck-boost type that operates as a buck circuit when the voltage across the electric double-layer capacitor 901 is higher than the certain voltage and that operates as a boost circuit when the voltage across the electric double-layer capacitor 901 is lower than the certain voltage.

When the electronic pen cartridge 1A of this embodiment (or electronic pen in which the electronic pen cartridge 1A is mounted) is mounted on a charger that is not illustrated in the figure, an induced electromotive force is generated in the coil 221 due to an alternating magnetic field generated by the charger and charges the electric double-layer capacitor 901 through the diode 902.

In the above-described embodiment, a configuration using the MEMS is employed as the writing pressure detector 40. However, the writing pressure detector 40 is not limited thereto. For example, the writing pressure detector 40 with the following configuration which is disclosed in Japanese Patent Laid-open No. 2016-126503 may be used. Specifically, a first electrode is disposed on the side of one surface of a plate-shaped dielectric, and an electrically-conductive elastic component is disposed on the side of the opposite surface of the dielectric. Further, the capacitance is varied according to the contact area between the electrically-conductive elastic component and the dielectric depending on the applied writing pressure.

It should be understood by those skilled in the art that various modifications, combinations, sub-combinations and alterations may occur depending on design requirements and other factors insofar as they are within the scope of the appended claims or the equivalents thereof.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen cartridge, configured to be mounted on a mounting part disposed in a pen-shaped casing, the electronic pen cartridge comprising:

an electronic pen main unit that includes: i) an interaction part configured to perform transmission and reception of signals with a position detecting sensor, ii) a tip part configured to be capable of protruding outside from an opening of the pen-shaped casing, and iii) a first coupling part provided at an end part opposite from the tip part in an axial center direction; and a mounting adapter interposed between the first coupling part and the mounting part, the mounting adapter including: i) a second coupling part configured to be detachably connectable to the first coupling part of the electronic pen main unit, ii) a third coupling part configured to be detachably connectable to the mounting part of the pen-shaped casing, and iii) an elastic component that, when the second coupling part is connected to the first coupling part, exerts an elastic force to separate the mounting adapter from the electronic pen main unit in the axial center direction, wherein the elastic component serves as a shock absorber against a shock load applied along the axial center direction.

2. The electronic pen cartridge according to claim 1, wherein the pen-shaped casing is a casing of a writing implement.

3. The electronic pen cartridge according to claim 2, wherein a length of the electronic pen main unit in the axial center direction is set to a predetermined length, and a length of the mounting adapter in the axial center direction varies according to the pen-shaped casing of the writing implement.

4. The electronic pen cartridge according to claim 2, wherein the third coupling part of the mounting adapter has a configuration corresponding to a configuration of the mounting part of the pen-shaped casing of the writing implement.

5. The electronic pen cartridge according to claim 1, wherein the second coupling part of the mounting adapter is provided at an end part of a rod-shaped component, and the elastic component is a coil spring disposed around the rod-shaped component.

6. The electronic pen cartridge according to claim 5, wherein the rod-shaped component includes a resin having elasticity that allows bending also in a direction intersecting the axial center direction.

7. The electronic pen cartridge according to claim 1, wherein the first coupling part is connected to the second coupling part against the elastic force of the elastic component.

8. The electronic pen cartridge according to claim 1, wherein the electronic pen main unit includes a writing pressure detector that detects a pressure applied to the tip part, and the elastic component of the mounting adapter is configured so as not to be elastically displaced in the axial center direction within a range of the pressure to be detected by the writing pressure detector, and as to be elastically displaced when the pressure exceeding the range is applied.

9. The electronic pen cartridge according to claim 8, wherein the writing pressure detector comprises a micro-electro-mechanical system (MEMS) that detects the pressure as a capacitance value.

10. The electronic pen cartridge according to claim 1, wherein the interaction part includes a resonant circuit including a coil and a capacitor and performs transmission and reception of signals by forming an electromagnetic coupling with the position detecting sensor.

11. The electronic pen cartridge according to claim 1, wherein the interaction part performs transmission and reception of signals by forming a capacitive coupling with the position detecting sensor.

12. The electronic pen cartridge according to claim 1, wherein the second coupling part of the mounting adapter includes a first projection or a first hole, and the first coupling part of the electronic pen main unit includes a second hole or a second projection, the first projection configured to be detachably received in the second hole, or the second projection configured to be detachably received in the first hole.

13. An electronic pen, comprising:

a pen-shaped casing;

a mounting part disposed in the pen-shaped casing; and an electronic pen cartridge mounted on the mounting part and including:

an electronic pen main unit that includes: i) an interaction part configured to perform transmission and reception of signals with a position detecting sensor, ii) a tip part configured to be capable of protruding outside from an opening of the pen-shaped casing, and iii) a first coupling part provided at an end part opposite from the tip part in an axial center direction; and a mounting adapter interposed between the first coupling part and the mounting part, the mounting adapter including: i) a second coupling part configured to be detachably connectable to the first coupling part of the electronic pen main unit, ii) a third coupling part configured to be detachably connectable to the mounting part of the pen-shaped casing, and iii) an elastic component that, when the second coupling part is connected to the first coupling part, exerts an elastic force to separate the mounting adapter from the electronic pen main unit in the axial center direction, wherein the elastic component serves as a shock absorber against a shock load applied along the axial center direction.

14. The electronic pen according to claim 13, comprising:

a knock mechanism including the mounting part and configured to push or pull the tip part of the electronic pen main unit out of or into the pen-shaped casing, wherein the third coupling part of the mounting adapter of the electronic pen cartridge is detachably connectable to the mounting part of the knock mechanism.

15. The electronic pen according to claim 14, wherein the knock mechanism is configured to allow a plurality of cartridge-type refills to selectively protrude and retract via the opening of the pen-shaped casing, and the electronic pen cartridge is employed as at least one of the plurality of cartridge-type refills.

16. The electronic pen according to claim 13, wherein the second coupling part of the mounting adapter includes a first projection or a first hole, and the first coupling part of the electronic pen main unit includes a second hole or a second projection, the first projection configured to be detachably received in the second hole, or the second projection configured to be detachably received in the first hole.

17. An electronic pen main unit that forms an electronic pen cartridge, wherein the electronic pen cartridge includes a mounting adapter, the mounting adapter including: i) a second coupling part configured to be detachably connectable to the electronic pen main unit, ii) a third coupling part configured to be detachably connectable to a mounting part of a pen-shaped casing of an electronic pen, and iii) an elastic component that, when the second coupling part is connected to the electronic pen main unit, exerts an elastic force to separate the mounting adapter from the electronic pen main unit in an axial center direction, wherein the elastic component serves as a shock absorber against a shock load applied along the axial center direction, the electronic pen main unit comprising:

i) an interaction part configured to perform transmission and reception of signals with a position detecting sensor;

ii) a tip part configured to be capable of protruding outside from an opening of the pen-shaped casing; and iii) a first coupling part provided at an end part opposite from the tip part in the axial center direction and configured to be detachably connectable to the second coupling part of the mounting adapter.

18. The electronic pen main unit according to claim 17, comprising:

a writing pressure detector configured to detect a pressure applied to the tip part, wherein a range of the pressure to be detected in the axial center direction by the writing pressure detector is set such that the elastic component of the mounting adapter is not elastically displaced in the axial center direction within the range of the pressure and is elastically displaced when the pressure exceeding the range is applied.

19. The electronic pen main unit according to claim 17, wherein the second coupling part of the mounting adapter includes a first projection or a first hole, and the first coupling part of the electronic pen main unit includes a second hole or a second projection, the first projection configured to be detachably received in the second hole, or the second projection configured to be detachably received in the first hole.

* * * * *